US006352223B1

United States Patent
Larramendy

(10) Patent No.: US 6,352,223 B1
(45) Date of Patent: Mar. 5, 2002

(54) SYSTEM FOR THE YAW CONTROL OF AN AIRCRAFT

(75) Inventor: Panxika Larramendy, Toulouse (FR)

(73) Assignee: Aerospatiale Matra Airbus, Paris (FR)

( * ) Notice: Subject to any disclaimer, the term of this patent is extended or adjusted under 35 U.S.C. 154(b) by 0 days.

(21) Appl. No.: 09/497,397

(22) Filed: Feb. 3, 2000

(30) Foreign Application Priority Data

Feb. 4, 1999 (FR) ............................................. 99 01300

(51) Int. Cl.$^7$ ................................................. G05D 1/10
(52) U.S. Cl. ....................................................... 244/177
(58) Field of Search ................................. 244/183, 184, 244/194, 234, 235, 221, 230, 195

(56) References Cited

U.S. PATENT DOCUMENTS

| | | | | |
|---|---|---|---|---|
| 3,512,737 A | * | 5/1970 | Platt et al. | |
| 4,094,479 A | | 6/1978 | Kennedy, Jr. | |
| 4,236,685 A | * | 12/1980 | Kissel | 244/223 |
| 4,422,180 A | * | 12/1983 | Wendt | 455/603 |
| 4,533,097 A | * | 8/1985 | Aldrich | 244/78 |
| 4,759,515 A | * | 7/1988 | Carl | 244/76 R |
| 4,793,576 A | * | 12/1988 | Frerk | 244/228 |
| 4,935,682 A | | 6/1990 | McCuen | |
| 4,964,599 A | * | 10/1990 | Farineau | 244/195 |
| 5,109,672 A | * | 5/1992 | Chenoweth et al. | 60/456 |
| 5,791,596 A | * | 8/1998 | Gautier et al. | 244/76 R |
| 6,206,329 B1 | * | 5/2001 | Gautier et al. | 244/221 |

FOREIGN PATENT DOCUMENTS

| | | |
|---|---|---|
| EP | 0742141 | 11/1996 |
| FR | 2617120 | 12/1988 |

* cited by examiner

Primary Examiner—Peter M. Poon
Assistant Examiner—Kevin Jakel
(74) Attorney, Agent, or Firm—Stevens, Davis, Miller & Mosher, LLP

(57) ABSTRACT

The present invention relates to a system for the yaw control of an aircraft fitted with a plurality of engines, the system (SC) comprising in particular a computation unit (16) formulating a command dr for yaw control, $dr=Ka.\Phi_c+Kb.p+Kc.\Phi+Kd.r+Ke.\beta$, on the basis of the controlled roll attitude $\Phi_c$, of the roll rate p, of the effective roll attitude $\Phi$, of the yaw rate r, of the sideslip $\beta$ and of gains Ka, Kb, Kc, Kd and Ke which are fixed by a device (28). According to the invention, the system (SC) comprises a a device (30) for detecting any fault with an engine of the aircraft, and the device (28) is formed in such a way as to modify the values of the gains Ka, Kd and Ke relating respectively to the controlled roll attitude $\Phi_c$, to the yaw rate r and to the sideslip $\beta$, upon the detection by the device (30) of a fault with an engine of the aircraft.

9 Claims, 2 Drawing Sheets

SYSTEM FOR THE YAW CONTROL OF AN AIRCRAFT

The present invention relates to a system for the yaw control of an aircraft, in particular a civil airliner.

The Applicant's patent FR-2 617 120 discloses a system for the roll and yaw control of an aircraft, implementing electric flight controls.

As regards in particular the yaw control, this known system comprises:

- a control facility (rudder bar), for the yaw control, capable of being actuated by a pilot of the aircraft;
- a transducer delivering electrical signals PE depending on the position of said control facility and representative of a controlled direction;
- first means delivering electrical signals representative respectively of the controlled roll attitude $\Phi_c$, of the roll rate p, of the effective roll attitude $\Phi$, of the yaw rate r and of the sideslip $\beta$ of said aircraft;
- a computation unit formulating:
  an electrical command dr for yaw control, on the basis of the relation:

$$dr = Ka.\Phi_c + Kb.p + Kc.\Phi + Kd.r + Ke.\beta$$

in which:
  $\Phi_c$, p, $\Phi$, r and $\beta$ are the values delivered by said first means, and
  Ka, Kb, Kc, Kd and Ke are gains, the values of which are capable of being fixed by second means at nominal values; and
  an electrical command dpequi for roll control (required to be transmitted to ailerons and spoilers of said aircraft), on the basis of the relation:

$$dpequi = ka1.\Phi_c + kb1.p + kc1.\Phi + kd1.r + ke1.\beta + kf.PE,$$

ka1, kb1, kc1, kd1, ke1 and kf being gains; and
- a transmission device, of mechanical type, making it possible to combine said electrical command dr for yaw control and a mechanical command which originates directly from the control facility by way of a mechanical transmission and which is representative of the position of said control facility, so as to deliver a single combined command for yaw control which is intended to control a rudder of the aircraft.

This standard yaw control system presents numerous advantages and, in particular, it makes it possible to reduce the workload of the pilot. Moreover, it makes it possible to ensure:

good damping of the Dutch roll;
good coordination between roll and yaw, especially by taking into account the controlled and effective roll attitudes and the roll rate when computing the electrical command dr for yaw control; and
proper behavior of the aircraft on takeoff.

However, the effectiveness of this known system can be improved in the case of a fault with one of the engines of the aircraft, in particular as regards the yaw/roll control, this being especially so in unsteady flight configurations of the aircraft, that is to say those for which lift-augmenting means, such as lift-augmenting flaps, envisaged for landing and takeoff, are activated.

Moreover, one is aware that it is recommended, with control systems of this type, in the case of a fault with an engine in the approach phase, to carry out approach maneuvers without using the autothrottle. Indeed, when the autothrottle is engaged, the yaw torque induced by the thrust variations of the unfaulty engine or engines disturbs the behavior of the aircraft and increases the workload of the pilot, instead of reducing it.

The object of the present invention is to remedy these drawbacks. It relates to an aircraft yaw control system, which makes it possible to improve the yaw control in the case of a fault with an engine, in particular in the takeoff and landing phases, whilst maintaining close to nominal behavior of the aircraft, especially on takeoff.

For this purpose, according to the invention, the yaw control system, of the aforesaid type, for an aircraft fitted with a plurality of engines is noteworthy in that it moreover comprises third means for detecting any fault with one of said engines of the aircraft, and in that said second means are formed in such a way as to increase the value of the gain Kd relating to the yaw rate r and to modify the values of the gains Ka and Ke relating respectively to the controlled roll attitude $\Phi_c$ and to the sideslip $\beta$, upon the detection by said third means of a fault with an engine of the aircraft.

Thus, according to the invention, when there is a fault with an engine, the gains relating to the controlled roll attitude and to the sideslip are modified and the gain relating to the yaw rate is increased, so that said control system issues a rudder deflection command, which is correspondingly greater the higher the yaw rate and/or the sideslip and which thus makes it possible to counter, effectively and automatically, any disturbance in terms of yaw and slip, induced by the fault with the engine, thus making it possible to remedy the aforesaid drawbacks.

Moreover, in order to obtain roll behavior similar to the nominal lateral law, advantageously, said second means are formed in such a way as to modify the values of the gains Ka1 and Kf of the electrical command dpequi for roll control, relating respectively to the controlled roll attitude $\Phi_c$ and to the controlled direction, upon the detection by said third means of a fault with an engine of the aircraft, in such a way as to allow the aircraft to maintain the same roll behavior despite the fault.

The control system in accordance with the invention presents other advantages and, in particular, it ensures:

homogeneity in all flight phases;
preservation of the standard piloting procedures and maneuvers, that is to say it does not modify the piloting; and
reliable implementation, which is independent in particular of the speed of the aircraft or of the magnitude of the asymmetry induced by the fault with an engine.

Furthermore, advantageously, the control system in accordance with the invention comprises fourth means for determining the current flight configuration of the aircraft.

Additionally, advantageously, said third means are formed in such a way as to detect a fault with an engine, for an aircraft fitted with two engines:

condition 1: if the parameter N1 (rate of rotation of the low pressure module) of an engine is greater than a predetermined value and if the difference of the parameters N1 of the two engines is greater than a predetermined value, this making it possible to detect a fault with an engine in the takeoff phase; and condition 2: if the difference of the parameters N1 of the two engines is greater than a predetermined value and if a second characteristic condition is satisfied, for example the parameter N2 (rate of rotation of the high pressure module) of said engine is less than a predetermined value, an engine is idling, a fuel supply is cut off or an engine monitoring system is not switched on, this making it possible to detect a fault with an engine in the approach phase or the takeoff phase.

According to the invention, said second means carry out a modification, in particular an increase, of the values of the gains as a function of the current flight configuration of the aircraft. For this purpose, preferred values of the gains will be specified hereinafter as a function of various possible flight configurations.

Moreover, preferably, the system in accordance with the invention comprises means of priority action which are formed in such a way as to act on said second means so that the latter modify the values of the aforesaid gains, in the case of a fault with an engine, only when the aircraft is in flight and when it is in an unsteady flight configuration.

Furthermore, advantageously, said second means are formed in such a way as to remodify the values of the gains, modified previously following a fault with an engine, so as to return to said nominal values, at least when one of the following conditions is realized:

the aircraft switches to a steady configuration;

the engine initially faulty is no longer so and all the "engine" controls of the aircraft have no longer been idling for at least a predetermined duration; and for an altitude of the aircraft which is less than a predetermined altitude, the previously faulty engine is so only in respect of aforesaid condition 2 and not in respect of aforesaid condition 1, and the position of said control facility exceeds a predetermined position.

It will be noted that, through the amplifying action in accordance with the invention, the rudder is swung much harder and responds more swiftly to any variation in yaw and/or in slip. Also, for reasons connected with both comfort and the fatigue of said rudder, the amplifying action envisaged by the present invention is employed, preferably, only in the case of a fault with an engine, and in respect of the phases of flight with an unsteady configuration, that is to say on takeoff and on landing.

Additionally, in order to accommodate a dual objective in the approach phase, namely, on the one hand, to preserve control in respect of the action of the control facility, in particular to make it possible if necessary to return the speed vector of the aircraft to the axis of the latter, and, on the other hand, to maintain the amplifying action in accordance with the invention down to the ground, in particular so as not to disturb the pilot on landing, advantageously, second means are formed in such a way as to remodify, progressively, the values of the gains Kd and Ke, previously modified following a fault with an engine, so as to return to said nominal values, when the following conditions are simultaneously realized:

the aircraft is at an altitude which is less than a predetermined altitude;

the position of said control facility lies outside a predetermined range of positions; and only the aforesaid condition 2 is true (no condition 1).

Within the framework of the present invention, in order to ascertain whether the aircraft is or is not beneath said predetermined altitude, it is of course possible to measure its effective altitude directly, for example by means of radioaltimeters. However, other available information such as the position of the slats and of the flaps or the position of the landing gear may also be used for this purpose, in a complementary manner or as a variant.

Furthermore, especially for reasons of comfort, advantageously, the second means are formed in such a way as to modify, that is to say to increase and/or to lower, always progressively the values of the various gains, required to be modified upon implementation of the present invention.

The figures of the appended drawing will elucidate the manner in which the invention may be embodied. In these figures, identical references designate similar elements.

Figure 1:
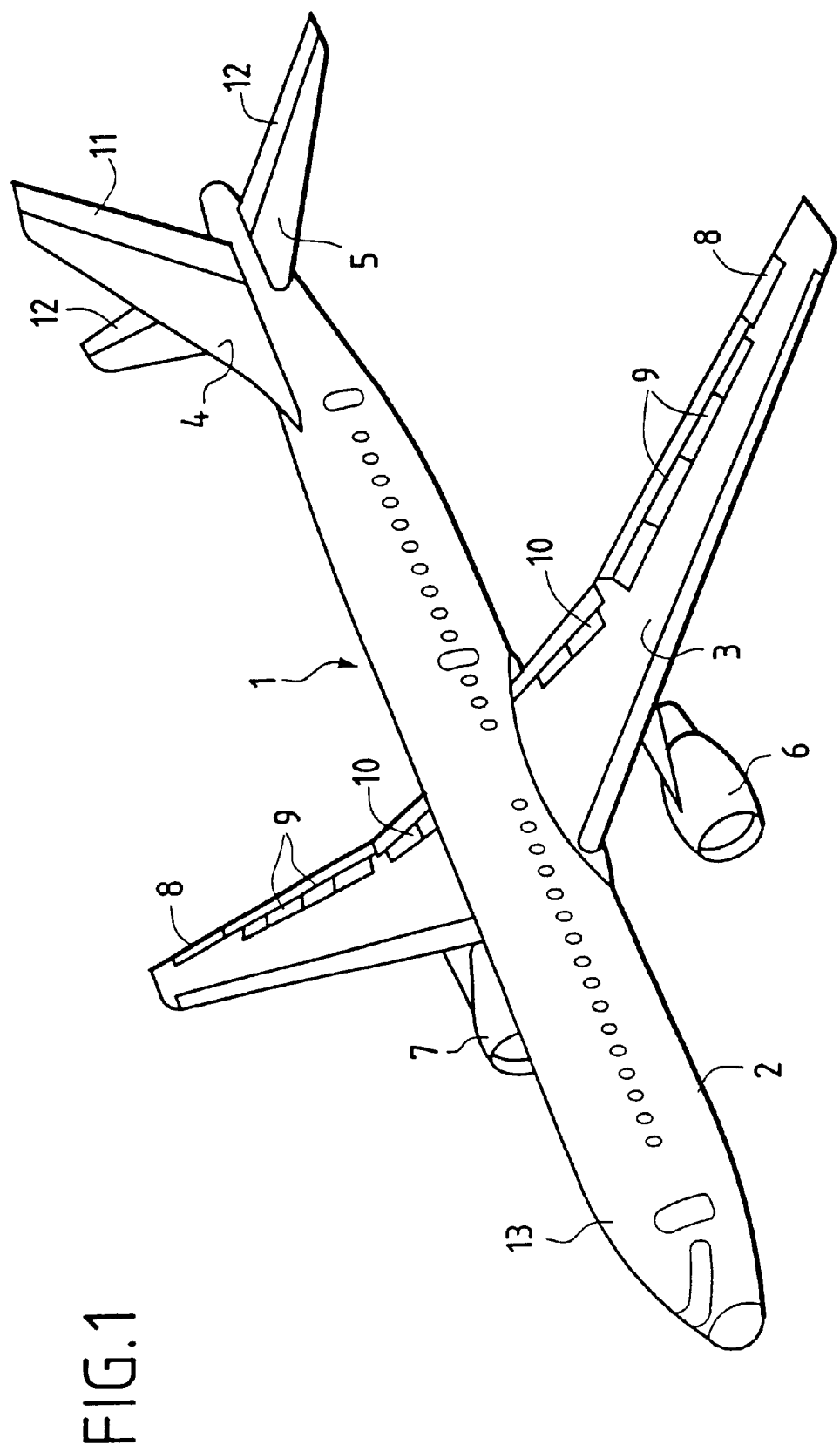
FIG. 1 shows, in perspective from above, an aircraft, in this instance a wide-bodied civil airplane, equipped with a yaw control system in accordance with the invention.

The wide-bodied civil airplane 1, shown in perspective in FIG. 1, comprises a fuselage 2, wings 3, a vertical fin 4 and a horizontal tailplane 5. It is propelled by two engines 6 and 7, attached under the wings 3. Of course, within the framework of the present invention, the airplane may be propelled by a different number of engines.

Provided on the upper surface of the wings 3 are trailing edge ailerons 8, spoiler flaps 9, also referred to as spoilers, and airbrakes 10. Provided on the vertical fin 4 is a rudder 11, whilst the elevators 12 are hinged to the trailing edge of the horizontal tailplane 5.

In a known manner, the yaw control of said airplane is carried out by means of the rudder 11. To this end, in the cockpit 13 of said airplane 1 there is provided at least one control facility, in this instance a rudder bar 14, available to a pilot (see FIG. 2). Said rudder bar 14 controls the rudder 11 in rotation about its axis of rotation X—X.

The present invention relates only to the control of the rudder 11, of the ailerons 8 and of the spoiler flaps 9, so that the controls of the airbrakes 10, of the elevators 12 and possibly of the horizontal tailplane 5 will not be described.

Figure 2:
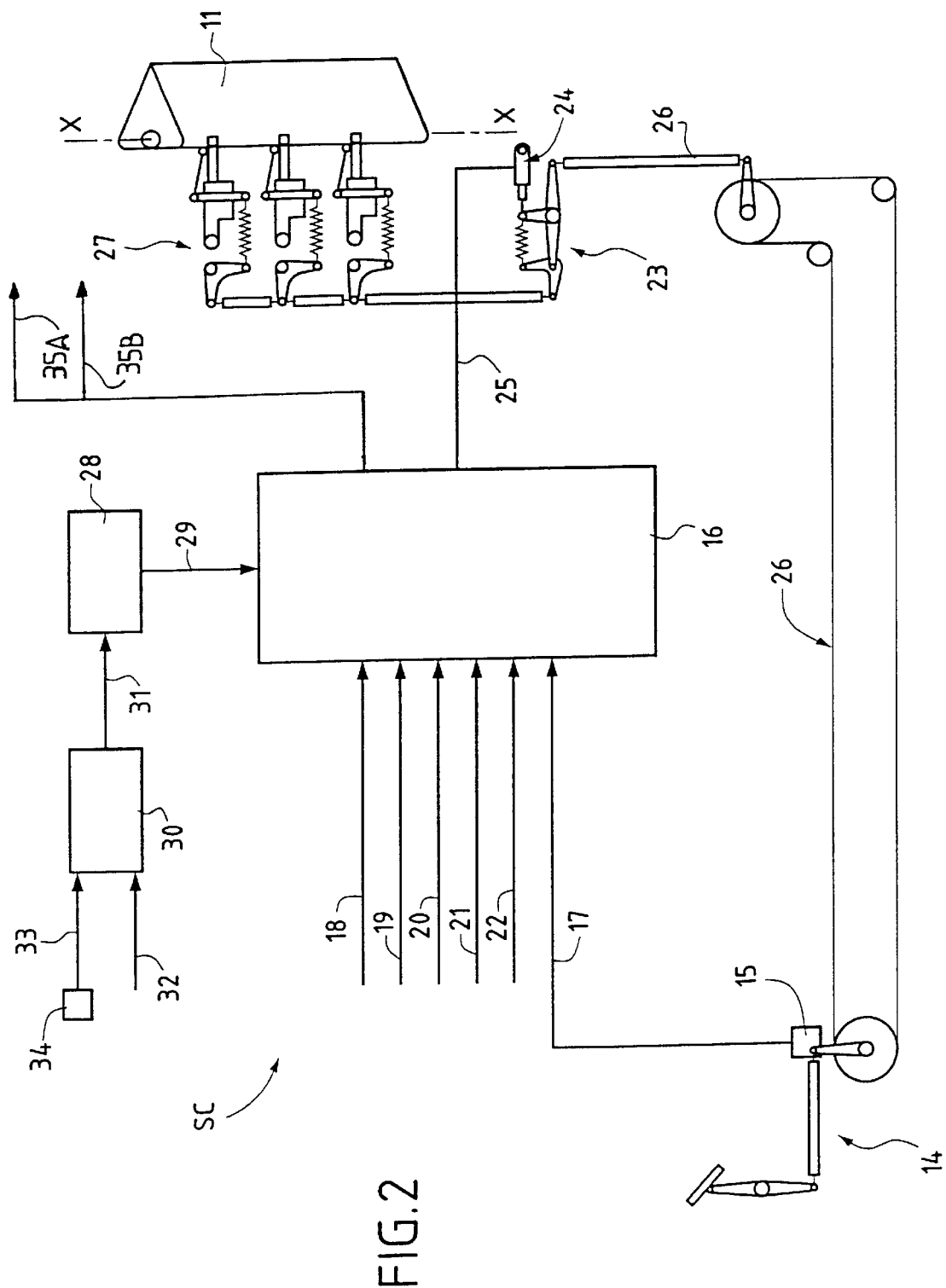
FIG. 2 represents the schematic diagram of a control system in accordance with the invention.

As shown by FIG. 2, the yaw control system SC comprises, in a known manner, in addition to the rudder bar 14:

a transducer 15 delivering electrical signals PE depending on the position of said rudder bar 14 and representative of a controlled direction;

a computation unit 16 connected by a link 17 to the transducer 15 and capable of formulating an electrical command dr for yaw control and an electrical command dpequi for roll control, which are specified hereinbelow;

means (not represented) specified hereinbelow, for delivering and transmitting to the computation unit 16, by way of links 18 to 22 respectively, electrical signals representative respectively of the controlled roll attitude $\Phi_c$, of the roll rate p, of the effective roll attitude $\Phi$, of the yaw rate r and of the sideslip $\beta$ of said airplane 1;

a transmission device 23 making it possible to combine:
  said electrical command dr for yaw control formulated by the computation unit 16 and received by way of actuation means 24 (for example jacks) which are connected to the output of the computation unit 16, as illustrated by a link 25; and
  a mechanical command which originates directly from the rudder bar 14 by way of a mechanical transmission 26 connecting the transmission device 23 to said rudder bar 14 and which is representative of the position of the latter. This transmission device 23 thus delivers a single combined command for yaw control;

a mechanical link 27 connected to said transmission device 23 and making it possible to actuate the rudder 11, about the axis X—X, according to said single combined command for yaw control; and a twinned electrical link 35A and 35B, for transmitting the electrical command dpequi to actuation facilities (not represented) for the ailerons 8 and for the spoilers 9 respectively.

In a preferred embodiment which is not represented:

the link 18 is connected to the output of a transducer associated with a column for controlling the roll of the airplane 1 and formulating a signal computed on the basis of the position of this control column;

the links 19 to 21 are connected to an inertial rig of the airplane 1; and the link 22 is connected to a standard computer responsible for estimating, in a known manner, the value of the sideslip $\beta$.

Moreover, the computation unit 16 determines the electrical commands dr and dpequi for yaw and roll control respectively, on the basis of the relations:

$$dr=Ka.\Phi_c+Kb.p+Kc.\Phi+Kd.r+Ke.\beta$$

$$dpequi=Ka1.\Phi_c+Kb1.p+Kc1.\Phi+Kd1.r+ke1.\beta+Kf.PE$$

in which:

PE, $\Phi_c$, p, $\Phi$, r and $\beta$ are the aforesaid values received by way of the links 17 to 22 respectively;

Ka, Kb, Kc, Kd, Ke, Ka1, Kc1, Kd1, Ke1 and Kf are gains, the values of which may be fixed by a computation unit 28 which is connected by a link 29 to the computation unit 16.

According to the invention, said control system SC moreover comprises means 30 connected by a link 31 to the computation unit 28, to detect any fault with one of said engines 6 and 7 of the airplane 1, and said computation unit 28 is formed in such a way as to increase the value of the gain Kd relating to the yaw rate r and to modify the values of the gains Ka and Ke relating respectively to the controlled roll attitude $\Phi_c$ and to the sideslip $\beta$, upon the detection by said third means of a fault with an engine of the aircraft.

Thus, by virtue of this modification of the gains Ka, Kd and Ke, when there is a fault with an engine 6 or 7, the control system SC brings about an appropriate deflection (following a modification of the electrical command dr dependent on said gains Ka, Kd and Ke) of the rudder 11, which is in particular all the greater the higher the yaw rate r. This appropriate deflection makes it possible to counter, effectively and automatically, any excursion in terms of slip and/or yaw, induced by a fault with an engine 6 or 7.

Moreover, in order to obtain roll behavior, when there is a fault with an engine 6 or 7 similar to the nominal lateral law, said second means 28 are formed in such a way as to modify the values of the gains Ka1 and Kf of the electrical command dpequi, relating respectively to the controlled roll attitude $\Phi$ and to the controlled direction, upon the detection by said third means 30 of a fault with an engine 6, 7 of the airplane 1, in such a way as to allow the airplane 1 to maintain its roll behavior despite the fault.

According to the invention, the magnitude of the modification of the values of the gains Ka, Kd, Ke, Ka1 and Kf depends on the flight configuration of the airplane 1 at the moment of the modification.

For this purpose, said control system SC moreover comprises means 34, of standard type, connected by a link 33 to the means 30, for determining the effective flight configuration of the airplane 1.

By way of preferred implementation, the modified values of the various aforesaid gains are specified hereinbelow for the following various known configurations which depend on the position of the slats and of the flaps 9 of the airplane 1:

a "0 configuration", no lift augmentation;

a "1 configuration", slight lift augmentation;

a "1+F configuration", medium lift augmentation; and

"2, 3 and Full configurations", high lift augmentation.

These various flight configurations correspond to the following positions of the slats and of the flaps 9 (the positions of the slats and of the flaps 9 varying, in a known manner, progressively from a 0 value corresponding to their complete retraction, up to values 23 and 32 corresponding to complete extension of the slats and of the flaps respectively):

| Configuration | Position of the slats | Position of the flaps 9 |
| --- | --- | --- |
| "0" | 0 | 0 |
| "1" | 16 | 0 |
| "1 + F" | 16 | 8 |
| "2" | 20 | 14 |
| "3" | 23 | 22 |
| "Full" | 23 | 32 |

According to the invention, upon modification thereof, the gains Ka, Kd and Ka1 are multiplied respectively by coefficients F1, F2 and F3 which satisfy the following values, as a function of the effective flight configuration of the airplane 1:

| Configuration | F1 | F2 | F3 |
| --- | --- | --- | --- |
| "0" | 1 | 1 | 1 |
| "1" | 1 | 1.5 | 1.15 |
| "1 + F" | 1 | 2 | 1.3 |
| "2" | 1 | 3 | 1.7 |
| "3" | 0.95 | 3 | 1.6 |
| "Full" | 0.9 | 3 | 1.6 |

As far as the gain Ke is concerned, it is replaced, upon its modification, by the following values depending on the flight configuration:

| Configuration | "0" | "1" | "1 + F" | "2" | "3" | "Full" |
| --- | --- | --- | --- | --- | --- | --- |
| Value | 0 | 0 | −0.5 | −1 | −1 | −1 |

Additionally, one is aware that the value of the gain Kf depends, during a standard control, on two variables, namely the speed Vc with respect to the air (in knots) and the flight configuration, as indicated in the following table:

| Configuration | Vc | | | | | |
| --- | --- | --- | --- | --- | --- | --- |
| | 100 | 130 | 170 | 210 | 250 | 340 |
| "0" | 0.5 | 0.5 | 0.5 | 0.35 | 0.23 | 0 |
| "1" | −0.2 | −0.2 | −0.3 | −0.25 | −0.25 | −0.25 |
| "2" | 0.14 | 0.14 | 0.08 | −0.01 | −0.01 | −0.01 |
| "3" | 0.1 | 0.2 | 0.32 | 0.35 | 0.35 | 0.35 |
| "full" | 0.1 | 0.15 | 0.16 | 0.2 | 0.2 | 0.2 |

During the implementation of the present invention, the means 28 modify, in the case of a fault with an engine 6 or 7, the value of the gain Kf so that the latter then exhibits one of the values indicated in the following table:

| Configuration | Vc | | | | | |
|---|---|---|---|---|---|---|
| | 100 | 130 | 170 | 210 | 250 | 340 |
| "0" | 0.5 | 0.5 | 0.5 | 0.35 | 0.23 | 0 |
| "1" | 0.1 | 0.1 | 0.1 | 0.2 | 0.2 | 0.2 |
| "2" | 0 | 0.1 | 0.2 | 0.3 | 0.3 | 0.3 |
| "3" | 0 | 0.1 | 0.2 | 0.2 | 0.2 | 0.2 |
| "full" | 0.1 | 0.2 | 0.2 | 0.2 | 0.2 | 0.2 |

Furthermore, the means 30 which receive appropriate information via a link 32 detect a fault with an engine, for example the engine 6, preferably when:

condition 1: the parameter N1 of said engine 6 is greater than a predetermined value, for example 80%, and the difference of the parameters N1 of the two engines 6 and 7 is greater than a predetermined value, for example 30%, thus making it possible to detect a fault with the engine 6 in the takeoff phase; and condition 2: the difference of the parameters N1 of the two engines 6 and 7 is greater than a predetermined value, for example 20%, and a second characteristic condition is satisfied, for example the parameter N2 of the engine 6 is less than 50%, the engine 6 is idling, a fuel supply to the engine 6 is cut off or a system for monitoring said engine 6 is not switched on, thus making it possible to detect a fault with the engine 6 in the approach or takeoff phase.

It will be noted that in a particular embodiment which is not represented, the means 30 and the computation units 16 and 18 may be integrated into a single unit, for example a flight control computer.

Of course, when the gains Ka, Kd and Ke are modified in accordance with the invention, the rudder 11 is swung much harder and responds more swiftly to any variations in yaw rate or in slip.

Also, for reasons of limiting the fatigue of said rudder 11, as well as for reasons of comfort, in a preferred mode of implementation, the means 30 act on the computation unit 28 so that it increases the values of the various aforesaid gains, in the case of a fault with an engine 6 or 7, only when the aircraft 1 is in flight and when it is in an unsteady flight configuration (takeoff or landing).

According to the invention, the computation unit 28 causes the values of the various gains, which have previously been modified following a fault with an engine 6 or 7, to return to the nominal values representative of normal operation, at least when one of the following conditions is realized:

the airplane 1 switches to a steady configuration;

the engine 6 or 7 initially faulty is no longer so and all the "engine" controls of the airplane 1 have no longer been idling for at least a predetermined duration, for example 10 seconds; and for an altitude of the aircraft which is less than a predetermined altitude, for example 30 meters, and hereinafter referred to as the critical altitude Zp, only the "engine faulty" condition 2 is realized (condition 1 is not) and the position of the rudder bar 14 exceeds a predetermined position. By way of illustration, in the case where no pedal command corresponds to 0° and a "full pedal" command to 35°, said predetermined position is preferably equal to 28°.

According to the invention, when there is a fault with an engine 6 or 7, when the following conditions are simultaneously fulfilled:

the airplane 1 is at an altitude which is less than the critical altitude Zp; and the position of the rudder bar 14 lies outside a predetermined range of positions, delimited preferably by 10° and 28°, the computation unit 28 modifies the values of the various aforesaid gains progressively, so as to return them, from the values modified following the fault, to the nominal values.

This progressive modification makes it possible to accommodate, onward of the critical altitude Zp and until landing, two objectives, namely:

preserve the pedal override of the nominal law (of the rudder bar 14) which is necessary in particular in strong crosswinds, especially in order if necessary to return the speed vector of the airplane 1 to its longitudinal axis; and maintain the amplifying action, although reduced (progressively), in accordance with the invention in such a way as to preserve the same behavior in terms of turbulence and yaw, irrespective of the altitude, and as not to disturb piloting in this tricky phase of flight (landing).

Additionally, to determine the actual altitude of the airplane 1, the latter is fitted, in a particular embodiment, with two radioaltimeters (not represented).

According to the invention, said airplane 1 is regarded as having an altitude less than the critical altitude Zp, if one of the following conditions is realized:

a) when no altimeter is faulty: at least one regards the actual altitude Z as being less than Zp and either both regard the actual altitude Z as being less than 5.Zp or, in the case of divergent values, the airplane 1 as being in an unsteady configuration;

b) when one of the altimeters is faulty: the other regards the actual altitude Z as being less than Zp and the speed of the airplane 1 as less than a predefined speed, for example 100 m/s;

c) when both altimeters are faulty: the two computers LGCIU (not represented) which manage the landing gear (also not represented) regard said gear as having been extended for at least a predetermined duration, for example 15 seconds;

d) when both altimeters and one LGCIU computer are faulty: the other LGCIU computer regards the landing gear as having been extended for, for example, 15 seconds and the speed of the airplane as being less than, for example, 100 m/s;

e) when both altimeters and both LGCIU computers are faulty: the angle of deflection of the flaps 9 is greater than a predetermined value.

This makes it possible to obtain a reliable estimate of any crossing of the airplane 1 below the critical altitude Zp, irrespective of the problems which may arise regarding the various equipment of said airplane 1.

Of course, instead of using radioaltimeters, one or more of the aforesaid conditions c) to e) can simply be used to arrive at the same result.

Preferably, according to the invention, the values of the various aforesaid gains are modified, that is to say increased or lowered, progressively, for example for a duration of two or five seconds [in particular upon a change of configuration (steady/unsteady)]. This makes it possible to attenuate the effect induced by the modifications, in particular as regards comfort.

In addition to the aforesaid advantages, the control system SC in accordance with the invention ensures:

- homogeneity in all flight phases;
- preservation of the standard piloting procedures and maneuvers, that is to say it does not modify the piloting; and
- reliable implementation, which is independent in particular of the speed of the airplane 1 or of the magnitude of the asymmetry induced by the fault with an engine 6 or 7;
- pedal override (rudder bar 14) for an altitude below the aforesaid critical altitude Zp; and
- good maintenance of the slip with satisfactory comfort: during the approach, on overshoot and on takeoff.

What is claimed is:

1. A system for yaw control of an aircraft fitted with a plurality of engines, said system comprising:

at least one control facility, for the yaw control, capable of being actuated by a pilot of the aircraft;

first means delivering electrical signals representative respectively of the controlled roll attitude $\Phi_c$, of the roll rate p, of the effective roll attitude $\Phi$, of the yaw rate and r and of the sideslip $\beta$ of said aircraft;

a computation unit formulating an electrical command dr for yaw control, on the basis of the relation:

$$dr = Ka.\Phi_c + Kb.p + Kc.\Phi + Kd.r + Ke.\beta$$

in which:

$\Phi_c$, p, $\Phi$, r and $\beta$ are the values delivered by said first means, and Ka, Kb, Kc, Kd, and Ke are gains, the values of which are capable of being fixed by second means at nominal values; and a transmission device making it possible to combine said electrical command dr for yaw control and a mechanical command which originates directly from the control facility by way of a mechanical transmission and which is representative of the position of said control facility, so as to deliver a single combined command for yaw control which is intended to control a rudder of the aircraft, which moreover comprises third means for detecting any fault with one of said engines of the aircraft, and wherein said second means are formed in such a way as to increase the value of the gain Kd relating to the yaw rate r and to modify the values of the gains Ka and Ke relating respectively to the controlled rolled attitude $\Phi_c$ and to the sideslip $\beta$, upon the detection by said third means of a fault with one of said engines of the aircraft.

2. The system as claimed in claim 1, said system moreover comprising a transducer delivering electrical signals PE depending on the position of said control facility and representative of a controlled direction and said computation furthermore formulating an electrical command dpequi for roll control, required to be transmitted to ailerons and spoilers of said aircraft, on the basis of the relation:

$$dpequi = Ka1.\Phi_c + Kb1.p + Kc1.\Phi + Kd1.r + ke1.\beta + Kf.PE, Ka1, Kb1, Kc1, Kd1, Ke1 \text{ and } Kf \text{ being gains,}$$

wherein said second means are formed in such a way as to modify the values of the gains Ka1 and Kf relating respectively to the controlled rolled attitude $\Phi_c$ and to the controlled direction, upon the detection by said third means of a fault with one of said engines of the aircraft, in such a way as to allow the aircraft to maintain roll behavior which is similar to the nominal law despite the fault.

3. The system as claimed in claim 1, which comprises fourth means for determining the current flight configuration of the aircraft.

4. The system as claimed in claim 3, wherein said second means carry out a modification of the values of the gains as a function of the current flight configuration of the aircraft.

5. The system as claimed in claim 3, which comprises means of priority action which are formed in such a way as to act on said second means so that the latter modify the values of the gains, in the case of a fault with one of said engines, only when the aircraft is in flight and when it is in an unsteady flight configuration.

6. The system as claimed in claim 1, wherein said plurality of engines comprises at least two engines and said third means are formed in such a way as to detect a fault with one of said two engines, namely:

condition 1: if the parameter N1 of said one of said two engines is greater than a predetermined value and if the difference of the parameters N1 of the two engines is greater than a predetermined value, a fault in the takeoff phase; and condition 2: if the difference of the parameters N1 of the two engines is greater than a predetermined value and if a second characteristic condition is satisfied, a fault in the approach phase.

7. The system as claimed in claim 6, wherein said second means are formed in such a way as to remodify the values of the gains, modified previously following a fault with one of said engines, so as to return to said nominal values, at least when one of the following conditions is realized:

the aircraft switches to a steady configuration;

the one of said engines that is initially faulty is no longer so and all the engine controls of the aircraft have no longer been idling for at least a predetermined duration; and for an altitude of the aircraft which is less than a predetermined altitude, the one of said engines that is faulty is so only in respect of condition 2 and no t in respect of condition 1 and the position of said control facility exceeds a predetermined position.

8. The system as claimed in claim 1, wherein the second means are formed in such a way as to remodify, progressively, the values of the gains, previously modified following a fault with one of said engines, so as to return to said nominal values, when the following conditions are simultaneously realized:

the aircraft is at an altitude which is less than a predetermined altitude; and the position of said control facility lies outside a predetermined range of positions.

9. The system as claimed in claim 1, wherein the second means are formed in such a way as to modify the values of the gains progressively.

* * * * *